(No Model.)
E. R. JONES.
AXLE FOR CAR WHEELS.
No. 343,905. Patented June 15, 1886.
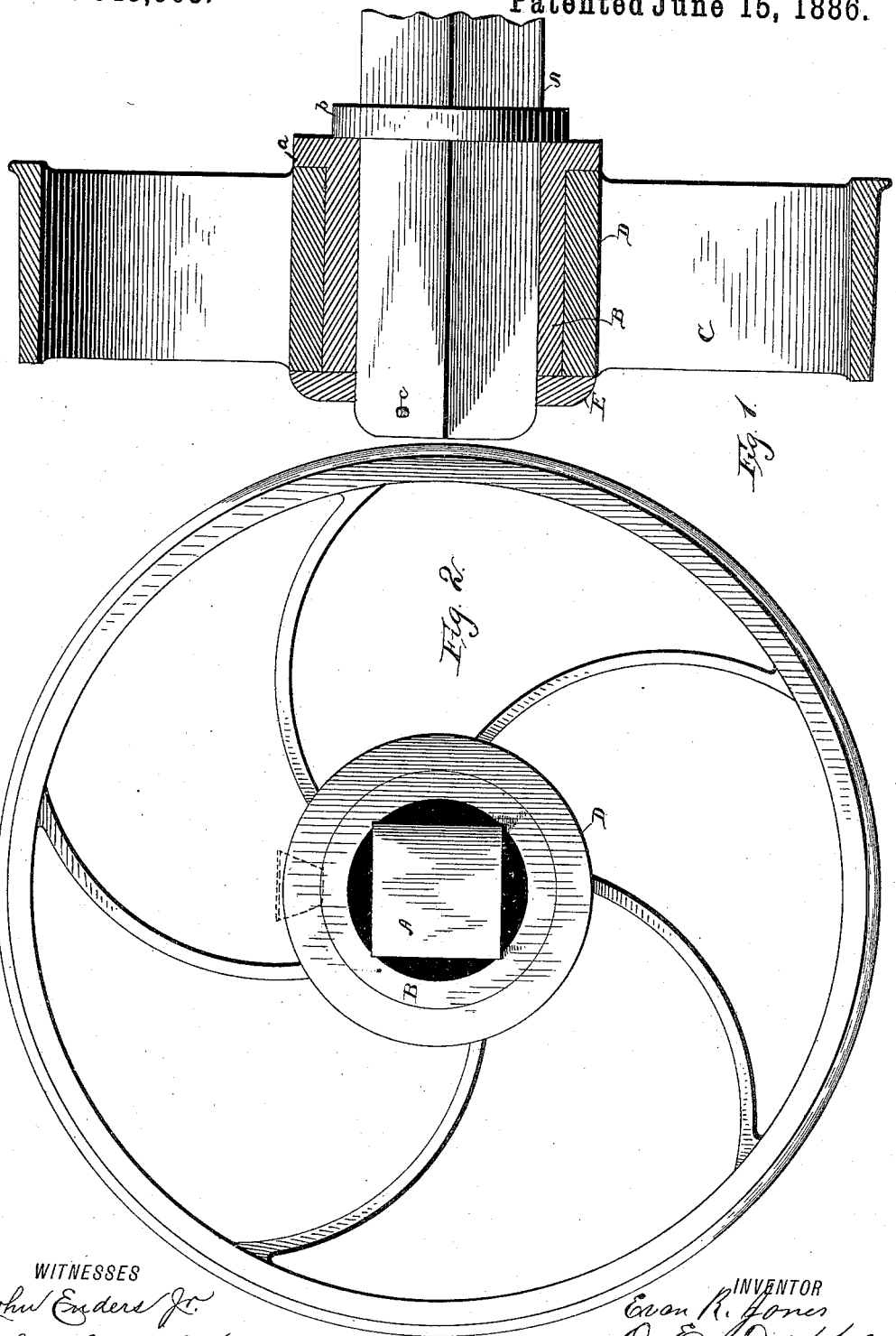
WITNESSES
John Enders Jr.
Chas Fernald.
INVENTOR
Evan R. Jones
By O. E. Duffy
Attorney

UNITED STATES PATENT OFFICE.

EVAN R. JONES, OF BIRMINGHAM, ALABAMA.

AXLE FOR CAR-WHEELS.

SPECIFICATION forming part of Letters Patent No. 343,905, dated June 15, 1886.

Application filed January 5, 1886. Serial No. 187,690. (No model.)

*To all whom it may concern:*

Be it known that I, EVAN R. JONES, of Birmingham, in the county of Jefferson and State of Alabama, have invented certain new and useful Improvements in Axles for Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to axles generally, but more particularly to car-axles for tramways for mines, railroad-building, excavating, and the like, where a high degree of speed is not necessary.

In railroad-building, excavating, and mining the rough usage of the tramway-cars is well known, they are exposed to all sorts of weather, and frequently covered with earth and mud, so that the wear and tear is so great that they last but a very short time, and when they are carefully built the cost is so great that it materially lessens the percentage of profits to keep them in order and to supply new ones. To simplify their construction, cheapen their first cost, and make them easy of repair and durable is the object of my invention.

To this end my invention consists in first taking an ordinary shaft of iron of square section and cutting it off in proper lengths, then driving or shrinking a collar on the end of said shaft to the required distance for the hub of the wheel, and outside of this collar I also drive or shrink on a sleeve or bushing of different contour to the axle, preferably round in its inner bore, so that it cannot turn, the corners of a square or irregular axle embedding themselves in the bushing, and thus preventing it from turning. The bushing or sleeve may be provided with a collar integral therewith, which will do away with the collar first spoken of.

The size of the journal-bearing of the sleeve is first predetermined, and may be made of cast malleable iron, brass, or other suitable metal, so that it will not crack or break in driving or shrinking it on. The bore of the wheels which are preferably hardened by chills or otherwise, is made to fit the external bearing of the sleeve or bushing; but it is not essential that a very snug fit of the bore of the wheel and bushing be had, as would be necessary if a high rate of speed were desired. Outside of the wheel I place a washer square in its inner bore, but round on its periphery being made to fit the square axle. A linchpin or split key or other means may be employed to retain the wheel to the axle, and any well-known lubricating devices may be used.

In the drawings hereto annexed, Figure 1 is transverse section of the wheel and sleeve or bushing, showing a square axle. Fig. 2 is an end elevation with the outside washer removed, showing the square axle and round bushing.

A is the axle, made of square iron.

B is the bushing or sleeve. In this case it is shown provided with a collar, *a*, integral therewith. When provided with this collar, the collar *b* may be dispensed with, but when made the collar *b* must not only be of sufficient diameter for the sleeve to work against, but must also be large enough to prevent the inner movement of the hub of the wheel over it. The sleeve B is in this instance shown as having a round bore, and of course a round smooth external journal-bearing surface. The journal-bearing of the sleeve may be case-hardened, as well as the hub of the wheel. These bearing-surfaces cannot be made too hard and tough, as the sand, cinder, dust, and other foreign substances are very severe on the journals, and frequently wear out the bearings in a very short time. These parts may be made interchangeable, if desired. The better plan is, when the sleeve is worn, to knock it off the axle and substitute a new one.

C is the wheel, provided with a hub, D, the bore of which is predetermined to correspond with the journal of the bushing.

When either the bore of the wheel or the journal-bearing of the sleeve are worn too much to work well together, a new bushing or sleeve may be substituted for the old one whose outer bearing-surface is of greater circumference, and thus only the sleeve is thrown away and the wheel utilized, as in the old way both axle and wheel are thrown aside.

On the end of the axle I place a washer, E, having in this instance an inner square hole and a circular outside; but it may be of any shape conforming to the shape of the axle. Through the end of the shaft I make a hole for a linchpin, c. Other retaining devices may be used, but this is the most simple and cheap—cheapness, combined with durability, being the prime objects of my invention.

It is evident that this construction may be applied to other vehicles—such as carts, wagons, wheelbarrows, and the like—and therefore I do not wish to limit myself to the exact form shown, nor to wheels and axles for tramway-cars.

Heretofore square axles and sleeves have been used; but it has been found difficult to make them fit, except at great expense, and when put together in a rough way they are loose and rattle to such an extent as to make the noise disagreeable and increase the wear and tear of the parts. Such construction I do not claim.

Having thus described my invention and the best means for carrying the same into effect at present known to me, what I claim as new, and desire to secure by Letters Patent, is—

1. An axle consisting of a solid rectangular bar of metal having a cylindrical sleeve or bushing driven or shrunk thereon in such a manner that the sharp corners of the bar will embed themselves in the bore of the sleeve or bushing, the said sleeve having an external bearing to correspond with the bore in the hub of the wheel, as set forth.

2. The combination, with an axle of rectangular section, of the bushing having an inner and outer circular surface, the inner to fit the sharp corners of the axle to hold the same in position, and the outer to form a journal-bearing, the axle having inside collars and outside washers for the purpose of retaining the wheels and bushings, substantially as described.

In testimony that I claim the foregoing as my own I affix my signature in presence of two witnesses.

EVAN R. JONES.

Witnesses:
O. E. DUFFY,
JOHN ENDERS, Jr.